H. M. KINNEY.
TRANSMISSION AND CONTROL SYSTEM.
APPLICATION FILED SEPT. 22, 1911.
1,029,018.
Patented June 11, 1912.
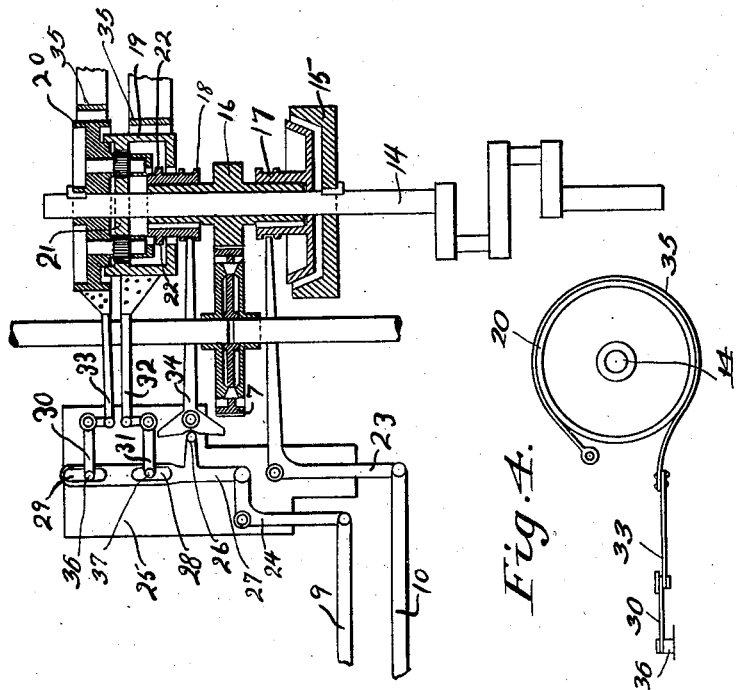
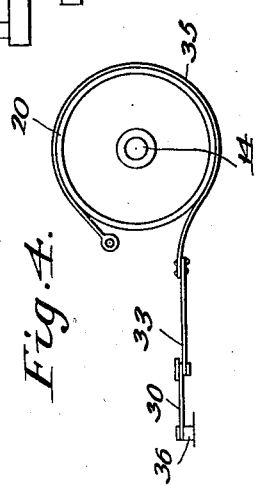
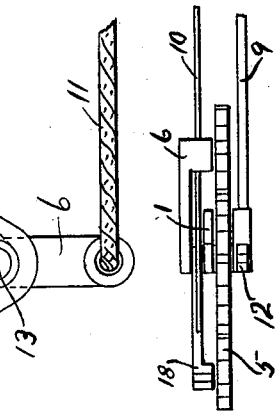
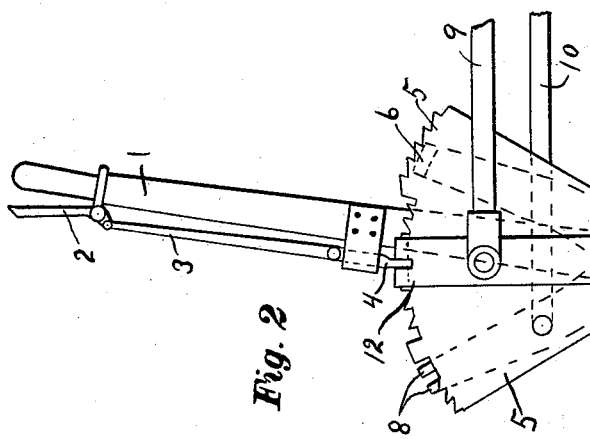
Witnesses:
Inventor

UNITED STATES PATENT OFFICE.

HENRY M. KINNEY, OF WINONA, MINNESOTA, ASSIGNOR TO WINONA WAGON COMPANY, OF WINONA, MINNESOTA, A CORPORATION.

TRANSMISSION AND CONTROL SYSTEM.

1,029,018.  Specification of Letters Patent.  Patented June 11, 1912.

Application filed September 22, 1911. Serial No. 650,750.

*To all whom it may concern:*

Be it known that I, HENRY M. KINNEY, a citizen of the United States, residing at Winona, in the county of Winona and State of Minnesota, have invented new and useful Improvements in Transmission and Control Systems, of which the following is a specification.

My invention relates to transmission and control systems for use on motor wagons and the novelty therein lies in the ease in which the engine, transmission gearing and brake system may be controlled by the operator and the naturalness of motions through which the operator must go in operating the system.

The main disadvantages in the present systems in use on automobiles, etc., are that the operator must use a plurality of levers to effect the desired control of his machine and in any case of emergency requiring quick and accurate action is very apt to use the wrong lever and thus increase the danger instead of averting it. In my invention I use only one lever to control the engine, transmission gears and brakes, and in order that the operator may never forget the proper position for the lever to effect the desired control I have arranged the different positions in their natural order, as follows: When the lever is at its neutral position it stands at its center of travel, *i. e.*, at the center of the quadrant. When it is desired to go ahead slowly the lever is moved a little ways ahead; when full speed ahead is wanted the lever is thrown to its extreme forward position. In the same manner if it is desired to run the machine backward the lever is moved a short distance back of center which throws in the slow reverse clutch in the transmission mechanism and runs the machine backward. If it is desired to apply the brakes the lever is moved to its extreme rear positions; the farther back it is moved, the tighter the brakes are applied. It will thus be seen that there is almost no chance for an operator to make an error in running his machine as only the one lever is required to effect the entire control.

In order that those familiar with the art to which my invention relates may fully understand the merits and construction thereof reference is made to the accompanying drawing in which like characters of reference indicate similar parts throughout the several views.

In the drawing: Figure 1 is a partly sectional and partly broken away plan view of my transmission gearing with such parts as are of necessity mounted near the gearing to effect the control. Fig. 2 is a side elevation of the control lever with its several parts, some parts being shown in dotted lines for the sake of clearness. Fig. 3 is a top plan view of my control lever with the latch arrangement omitted. Fig. 4 is an end view of the drum 20 showing the manner for operating the brake bands.

As will be seen in Fig. 1 the crank shaft 14 is lengthened and carries the transmission gearing proper. A fly wheel 15 is integrally mounted on the crank shaft 14 and is provided with an inner coned friction surface. A combined sleeve and driving gear wheel 16 is loosely mounted on the crank shaft 14 and carries at either end a sliding grooved sleeve 17 and 18, both of the sleeves 17 and 18 being splined to the long sleeves 16. The sleeve 17 is provided with a coned friction face adapted to engage the coned inner friction surface of the the fly wheel 15 when moved to its extreme position to the left, thus driving the sleeve and gear wheel 16 forward at the same speed as the crank shaft 14 and fly wheel 15. The sleeve 18 is provided with a plurality of lugs 22 adapted to fit into slots in the two brake wheels 19 and 20. A spur gear wheel 21 is connected to the crank shaft 14 and engages a plurality of planetary gears carried by the brake wheel 20. These planetary gears in turn engages the teeth of an internal gear on the inner side of the brake wheel 19. It will thus be seen that when a brake is applied to the brake wheel 19, and the sleeve 18 is thrown to the right until its lugs 22 engage the slots in the brake wheel 20, the sleeve and driving gear 16 will be driven ahead at a slower speed than when connected to the fly wheel direct by means of the friction clutch. When a brake is applied to the brake wheel 20 and the sleeve 18 is thrown to its extreme position to the left until its lugs 22 engage the slots in the brake wheel 19, the gear 16 will be driven in a slow reverse direction. The driving gear 16 engages the teeth of the differential gearing 7, power being taken from each side of the said differential gearing to drive the two traction wheels of the machine not shown in the drawing.

In order to effect the one lever control of this transmission system the operating lever 1 is provided with a latch 2, connecting-link 3 and lock 4 and is pivoted on a shaft 13 with three short levers 6, 8, 12 in such a manner that it may engage any one of them. The quadrant 5 is stationary and is provided at its upper part with teeth of a suitable form to hold the lock 4 in any desired position. The short lever 12 is provided with a notch at its top adapted to receive the lock 4 and be operated thereby. A rod 9 connects the lever 12 with the bell crank 24 which in turn connects with the slide 27. When the lock 4 is in the center of the quadrant and in engagement with the short lever 12 the transmission gearing is held in an inoperative position. When the lever 1 with its lock 4 is moved a short distance ahead carrying with it the short lever 12, the rod 9 drawn by the lever 12 operates the bell crank 24 and thereby moves the slide 27 until the sliding cam 26 on the slide 27 operates against one of the short arms on the double bell crank 34. Said bell crank 34 is thus moved by the cam 26 until its long arm, engaging the groove in the sliding sleeve 18, moves said sleeve 18 until its lugs 22 engage the slots in the brake wheel 20. A further movement of the levers 1 and 12 ahead will cause the end of the slot 28 in the slide 27 to engage the long arm of the bell crank 31 and moving it, the short arm of said bell crank 31 is caused to apply the brake to the brake wheel 19 by means of the rod 32 and thus drive the machine in a slow speed ahead as already described. The lever 1 in this position should be midway between its center and its extreme forward position.

As shown in Fig. 4 the means of braking the drums 19 and 20 comprises brake bands 35 to which the links 33 and 32 are connected. When the sliding link 27 is thrown to the left, the wall of slot 29 will engage the projection 36 from arm 30 and by rocking the same through lever 33 will draw the brake band 35 down upon the drum 20 to hold the same while owing to the position of the projecting member 37 on arm 31 with respect to slot 28, this arm will not be moved and the brake band 35 for drum 19 will remain loose. When the sliding arm 27 is moved in the opposite direction the reverse result will take place, brake band 35 on drum 19 being tightened and the brake band on drum 20 being left loose.

When full speed ahead is wanted the lock 4 is raised until it will not engage the lever 12 and thrown ahead until it engages the notch in the top of the lever 8 and moved ahead until the rod 10 connecting the lever 8 and bell crank 23 moves said bell crank 23 until it brings the sleeve and clutch 17 into positive engagement with the fly wheel 15 by means of the long end of the lever 23 engaging the groove in the said sleeve 17. It must be remembered that the normal position of the short lever 8 is near the forward end of the quadrant and it is never brought back to the center. When the reverse action of the gear is wanted the lever 12 is engaged by the lock 4 in the same manner as when neutral or slow speed ahead is desired only the lever 12 is then moved backward causing the rod 9 and bell crank 24 to move the slide 27 in the opposite direction to that in which it moved for the slow speed ahead, and operating the double crank 34 also in a reverse direction the lugs on the sleeve 18 are brought into engagement with the slots in the brake wheel 19, the brake on the brake wheel 20 being then set by the rod 33 and crank 30, the long arm of which engages the end of the slot 29 in the slide 27.

To set the brakes on the machine the lock 4 is raised clear of all notches and the two levers 8 and 12 and is moved to the extreme rear position where it strikes against the upper end of the brake lever 6 which is bent over for that purpose as shown most plainly in Fig. 3. A cable 11 connected to the lower end of the lever 6 also connects with the brakes which may be of any standard form.

Having thus described my invention, what I claim and desire to secure by Letters Patent is the following:

1. A transmission system comprising a crank shaft, a sleeve loose thereon, a drive gear on the sleeve, clutch sleeves splined to the sleeve at each side of the drive gear, means to move the clutch sleeves independently, and coöperating members having connection with the crank shaft for engagement with the respective clutch sleeves, whereby the drive gear may be rotated at either of two speeds.

2. A transmission system comprising a crank shaft, a sleeve loose thereon, a drive gear on the sleeve, clutch sleeves splined to the sleeve at each side of the drive gear, means to move the clutch sleeves independently, coöperating members on the crank shaft for engagement with the respective sleeves, one of said members including means engageable with its clutch sleeve in one position thereof for rotating the drive gear ahead at reduced speed and other means engageable with the said clutch sleeve in another position thereof for rotating the drive gear in reverse direction.

3. A transmission system comprising a crank shaft, a sleeve loose thereon, a drive gear on the sleeve, clutch sleeves splined to the sleeve at either side of the drive gear, coöperating members on the crank shaft for engagement with the respective clutch sleeves, one of said members operative through such engagement to rotate the drive gear at full speed ahead, the other of said members including means engageable with its clutch sleeve in one position thereof for rotating the drive gear ahead at reduced speed and other means engageable with said clutch sleeve in another position thereof for rotating the drive gear in reverse direction, and means to move the clutch sleeves independently.

4. A transmission system comprising a crank shaft, a sleeve loose thereon, a drive gear on the sleeve, clutch sleeves splined to the sleeve at either side of the drive gear, coöperating members on the crank shaft for engagement with the respective clutch sleeves, one of said members operative through such engagement to rotate the drive gear at full speed ahead, the other of said members including means engageable with its clutch sleeve in one position thereof for rotating the drive gear ahead at reduced speed and other means engageable with said clutch sleeve in another position thereof for rotating the drive gear in reverse direction, and a single lever and connections therefrom to each of said clutch sleeves for moving the same independently into operative and inoperative positions.

5. A transmission system comprising a crank shaft, a gear loose and a gear fast thereon, two brake drums loose on said shaft, an interior gear on one of said drums, a planetary gear system on the other drum meshing with said interior gear and said fast gear, means to hold either drum from rotation, and means to connect the other drum operatively with the loose gear, whereby the same may be driven at slow speed ahead or in reverse direction.

6. A transmission system comprising a crank shaft, a gear loose and a gear fast thereon, two brake drums loose on said shaft, an interior gear on one of said drums, a planetary gear system on the other drum meshing with said interior gear and said fast gear, means to hold either drum from rotation, means simultaneously to connect the other drum operatively with the loose gear, and a common member for selectively operating the drum-holding and said connecting means.

7. A transmission system comprising a crank shaft, a gear loose and a gear fast thereon, two brake drums loose on said shaft, an interior gear on one of said drums, a planetary gear system on the other drum meshing with said interior gear and said fast gear, a clutch member having rotative connection with the loose gear and operative in either of two positions to clutch the same to one or the other of said drums, a brake for each of said drums, and common means to move the clutch member into clutching engagement with one of said drums and apply its brake to the other of said drums.

8. A transmission system comprising a crank shaft, a gear loose and a gear fast thereon, two brake drums loose on said shaft, an interior gear on one of said drums, a planetary gear system on the other drum meshing with said interior gear and said fast gear, a clutch member having rotative connection with the loose gear and operative in either of two positions to clutch the same to one or the other of said drums, a two-armed fork lever for moving the clutch member in opposite directions to clutch the same with one or the other of said drums, a brake and independent brake lever for each drum, and a member provided with means for engagement with each of said levers such that movement of said member in one direction will connect the clutch with one drum and apply its brake to the other drum, while movement of the member in the opposite direction will effect the reverse operation.

9. A transmission system comprising a crank shaft, a gear loose and a gear fast thereon, two brake drums loose on said shaft, an interior gear on one of said drums, a planetary gear system on the other drum meshing with said interior gear and said fast gear, a clutch member having rotative connection with the loose gear and operative in either of two positions to clutch the same to one or the other of said drums, a pivoted fork lever for moving the clutch member provided with oppositely extended arms, a sliding member formed with a pair of slots and a lug engaging normally between said arms, an independent brake and brake lever for each drum, each of said brake levers having a member entering one of said slots at points adjacent the opposite ends thereof, whereby movement of the sliding member in either direction will first operate to connect the clutch member to one drum and then to apply the brake member to the other drum.

In testimony whereof I have affixed my signature in the presence of two subscribing witnesses.

HENRY M. KINNEY.

Witnesses:
R. W. PIERCE,
T. E. HIGGINS.

Copies of this patent may be obtained for five cents each, by addressing the "Commissioner of Patents, Washington, D. C."